(12) United States Patent
Wang et al.

(10) Patent No.: US 12,512,211 B2
(45) Date of Patent: Dec. 30, 2025

(54) SEMI-SUPERVISED LEARNING USING CO-TRAINING OF RADIOLOGY REPORT AND MEDICAL IMAGES

(71) Applicant: KONINKLIJKE PHILIPS N.V., Eindhoven (NL)

(72) Inventors: Xin Wang, Belmont, MA (US); Prescott Peter Klassen, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 435 days.

(21) Appl. No.: 17/928,315

(22) PCT Filed: May 27, 2021

(86) PCT No.: PCT/EP2021/064129
§ 371 (c)(1),
(2) Date: Nov. 29, 2022

(87) PCT Pub. No.: WO2021/244926
PCT Pub. Date: Dec. 9, 2021

(65) Prior Publication Data
US 2023/0207105 A1 Jun. 29, 2023

Related U.S. Application Data

(60) Provisional application No. 62/704,912, filed on Jun. 3, 2020.

(51) Int. Cl.
*G16H 30/40* (2018.01)
*G06V 10/764* (2022.01)
(Continued)

(52) U.S. Cl.
CPC .......... *G16H 30/40* (2018.01); *G06V 10/764* (2022.01); *G06V 10/82* (2022.01); *G16H 15/00* (2018.01); *G16H 50/70* (2018.01)

(58) Field of Classification Search
None
See application file for complete search history.

(56) References Cited

U.S. PATENT DOCUMENTS

2019/0073447 A1  3/2019  Guo
2019/0073448 A1  3/2019  Kochura
(Continued)

OTHER PUBLICATIONS

International Search Report and Written Opinion Dated Aug. 16, 2021, for International Application No. PCT/EP2021/064129 Filed May 27, 2021.

(Continued)

*Primary Examiner* — Mark R Milia

(57) ABSTRACT

A method (100) of training a machine-learned (ML) image classifier (14) to classify images (30) respective to a set of labels includes: generating image-based labels for the images from the set of labels and image-based label confidence values for the image-based labels by applying the ML image classifier to the images; generating report-based labels for the images from the set of labels and report-based label confidence values for the report-based labels by applying a report classifier (16) to corresponding radiology reports; selecting a training subset of the set of images based on the image-based labels, the report-based labels, the image-based label confidence values, and the report-based label confidence values; assigning a pseudo-label for each image of the training subset which is one of the image-based label or the report-based label for the image; and training the ML image classifier using at least the selected training subset and the assigned pseudo-labels.

14 Claims, 2 Drawing Sheets

(51) Int. Cl.
*G06V 10/82* (2022.01)
*G16H 15/00* (2018.01)
*G16H 50/70* (2018.01)

(56) References Cited

U.S. PATENT DOCUMENTS

| | | |
|---|---|---|
| 2019/0209116 A1 | 7/2019 | Sjostrand |
| 2019/0340753 A1 | 11/2019 | Brestel |
| 2019/0340763 A1 | 11/2019 | Laserson |
| 2020/0380304 A1* | 12/2020 | Sallee .................... G06T 7/136 |

OTHER PUBLICATIONS

Draelos, et al: "Machine-Learning-Based Multiple Abnormality Prediction with Large-Scale Chest Computed Tomography Volumes", Feb. 12, 2020.

Xia, et al: "3D Semi-Supervised Learning with Uncertainty-Aware Multi-View Co-training", Feb. 24, 2020.

Zhou, et al: "Tri-Training: Exploiting Unlabeled Data Using Three Classifiers", IEEE Transactions on Knowledge and Data Engineering, vol. 17, No. 11, Nov. 2005.

Blum, et al: "Combining labeled and unlabeled data with co-training", In Proceedings of the eleventh annual conference on Computational learning theory, pp. 92-100. ACM, 1998.

Søgaard, et al: "Simple semi-supervised training of part-of-speech taggers", Proceedings of the ACL 2010 Conference Short Papers, (2010).

* cited by examiner

SEMI-SUPERVISED LEARNING USING CO-TRAINING OF RADIOLOGY REPORT AND MEDICAL IMAGES

CROSS REFERENCE TO RELATED APPLICATIONS

This application is the U.S. National Phase application under 35 U.S.C. § 371 of International Application No. PCT/EP2021/064129 filed May 27, 2021, which claims the benefit of U.S. Provisional Patent Application No. 62/704,912 filed Jun. 3, 2020. These applications are hereby incorporated by reference herein.

FIELD

The following relates generally to the imaging arts, image labeling arts, image annotation arts, radiology report analysis arts, image-based computer-aided diagnosis (CADx) arts, artificial intelligence (AI) arts, AI self-learning arts, and related arts.

BACKGROUND

Machine learning (ML) algorithms have made an impact in the field of medical imaging. For example, ML algorithms can be used to identify tumors or lesions or other pathology-related image features thereby providing image-based CADx systems for generating treatment data; can be used to detect image artifacts for purposes such as avoiding misdiagnoses based on such artifacts and for radiology department quality control, and so forth. Medical imaging datasets have been growing in size, thus potentially providing a substantial database for training ML algorithms. However, a major challenge for supervised learning of ML algorithms for image processing is the lack of annotated images which limits the generalizability of the model. Methods which make use of large, readily available amounts of unlabeled data can improve the model's generalizability and reduce labeling efforts.

To utilize a large number of unlabeled images, a self-training method comprising a pseudo-label based semi-supervised learning approach can be utilized. In self-training, a model is trained on a labeled and an unlabeled data set. Such self-training methods can be used in conjunction with training of most neural network (NN) models and other ML algorithms. In a self-training method, a baseline model is trained with the labeled set of data using supervised methods. Then, the initially trained model is applied to the unlabeled set. For an image, if the probability assigned to the most likely class is higher than a predetermined threshold, then this image is added to the labeled set with a pseudo-label which is assigned as the class that has the maximum predicted probability. In a next round of (incremental) training of the model, this pseudo-label is used as if it was the true label. This process is repeated for a fixed number of iterations or until no more predictions on unlabeled images are confident.

However, with self-training, the model is unable to correct its own mistakes, and indeed the self-training can amplify mistakes. If the predictions of the model on unlabeled data are confident but wrong, the erroneous data is incorporated into training and the next round of (incremental) training relies upon and hence reinforces this error, so that the model's errors are amplified.

The following discloses certain improvements to overcome these problems and others.

SUMMARY

In one aspect, a non-transitory computer readable medium stores instructions executable by at least one electronic processor to perform a method of training a machine-learned (ML) image classifier to classify images respective to a set of labels using a set of images which are not labeled respective to the set of labels and corresponding radiology reports that are not labeled respective to the set of labels. The method includes: generating image-based labels for the images from the set of labels and image-based label confidence values for the image-based labels by applying the ML image classifier to the images; generating report-based labels for the images from the set of labels and report-based label confidence values for the report-based labels by applying a report classifier to the corresponding radiology reports; selecting a training subset of the set of images based on the image-based labels, the report-based labels, the image-based label confidence values, and the report-based label confidence values; assigning a pseudo-label for each image of the training subset which is one of the image-based label or the report-based label for the image; and training the ML image classifier using at least the selected training subset and the assigned pseudo-labels.

In another aspect, a non-transitory computer readable medium stores instructions executable by at least one electronic processor to perform a method of training a ML report classifier to classify images respective to a set of labels using a set of images which are not labeled respective to the set of labels and corresponding radiology reports that are not labeled respective to the set of labels. The method includes: generating image-based labels for the images from the set of labels and image-based label confidence values for the image-based labels by applying a ML image classifier to the images; generating report-based labels for the images from the set of labels and report-based label confidence values for the report-based labels by applying the report classifier to the corresponding radiology reports; selecting a report training subset of the set of radiology reports based on the image-based labels, the report-based labels, the image-based label confidence values, and the report-based label confidence values of the corresponding image; assigning a report pseudo-label for each radiology report of the report training subset which is one of the image-based label or the report-based label for the corresponding image; and training the report classifier using at least the selected report training subset and the assigned report pseudo-labels.

In another aspect, a method of training a ML image classifier and a trained ML report classifier to classify images respective to a set of labels using a set of images which are not labeled respective to the set of labels and corresponding radiology reports that are not labeled respective to the set of labels and training. The method includes: generating image-based labels for the images from the set of labels and image-based label confidence values for the image-based labels by applying the ML image classifier to the images; generating report-based labels for the images from the set of labels and report-based label confidence values for the report-based labels by applying the ML report classifier to the corresponding radiology reports; selecting a training subset of the set of images based on the image-based labels, the report-based labels, the image-based label confidence values, and the report-based label confidence values; selecting a report training subset of the set of radiology reports based on the image-based labels, the report-based labels, the image-based label confidence values, and the report-based label confidence values of the corresponding image; assigning a pseudo-label for each image of the training subset which is one of the image-based label or the report-based label for the image; assigning a report pseudo-label for each radiology report of the report training subset which is one of the image-based label or the report-based label for the corresponding image; training the ML image classifier using at least the selected training subset and the assigned pseudo-labels; and training the report classifier using at least the selected report training subset and the assigned report pseudo-labels.

In another aspect, a non-transitory computer readable medium stores instructions executable by at least one electronic processor to perform a method of training a first-view machine-learned (ML) image classifier to classify images of a first view respective to a set of labels using a set of first-view images which are not labeled respective to the set of labels and training a second-view ML image classifier to classify images of a second view respective to the set of labels using a set of second-view images corresponding that are not labeled respective to the set of labels and that correspond to the images of the first view. The method includes: (i) for the first-view images, generating first-view image-based labels for the images from the set of labels and first-view image-based label confidence values for the image-based labels by applying the first-view ML image classifier to the first-view images; (ii) for the second-view images, generating second-view image-based labels for the images from the set of labels and second-view image-based label confidence values for the image-based labels by applying the second-view ML image classifier to the second-view images; (iii) selecting a first-view training subset of the set of first-view images based on the first-view image-based labels, the second-view image-based labels, the first-view image-based label confidence values, and the second-view image-based label confidence values; (iv) selecting a second-view training subset of the set of second-view images based on the first-view image-based labels, the second-view image-based labels, the first-view image-based label confidence values, and the second-view image-based label confidence values; (v) assigning a pseudo-label for each first-view image of the first-view training subset which is one of the first-view image-based label or the corresponding second-view image-based label; (vi) assigning a pseudo-label for each second-view image of the second-view training subset which is one of the second-view image-based label or the corresponding first-view image-based label; and repeating the steps (i), (ii), (iii), (iv), (v), and (vi) for at least one iteration.

One advantage resides in providing a more robust ML-trained image classifier by leveraging additional information contained in corresponding radiology reports to improve training of the image classifier.

Another advantage resides in ML co-training of an image classifier and a radiology report classifier that leverages information exchange.

Another advantage resides in providing radiology report pseudo-labels and image pseudo-labels for use in training an ML classifier.

Another advantage resides in training an ML classifier with one of a radiology report pseudo-label or a complementary image pseudo-label that exceeds a predetermined threshold.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
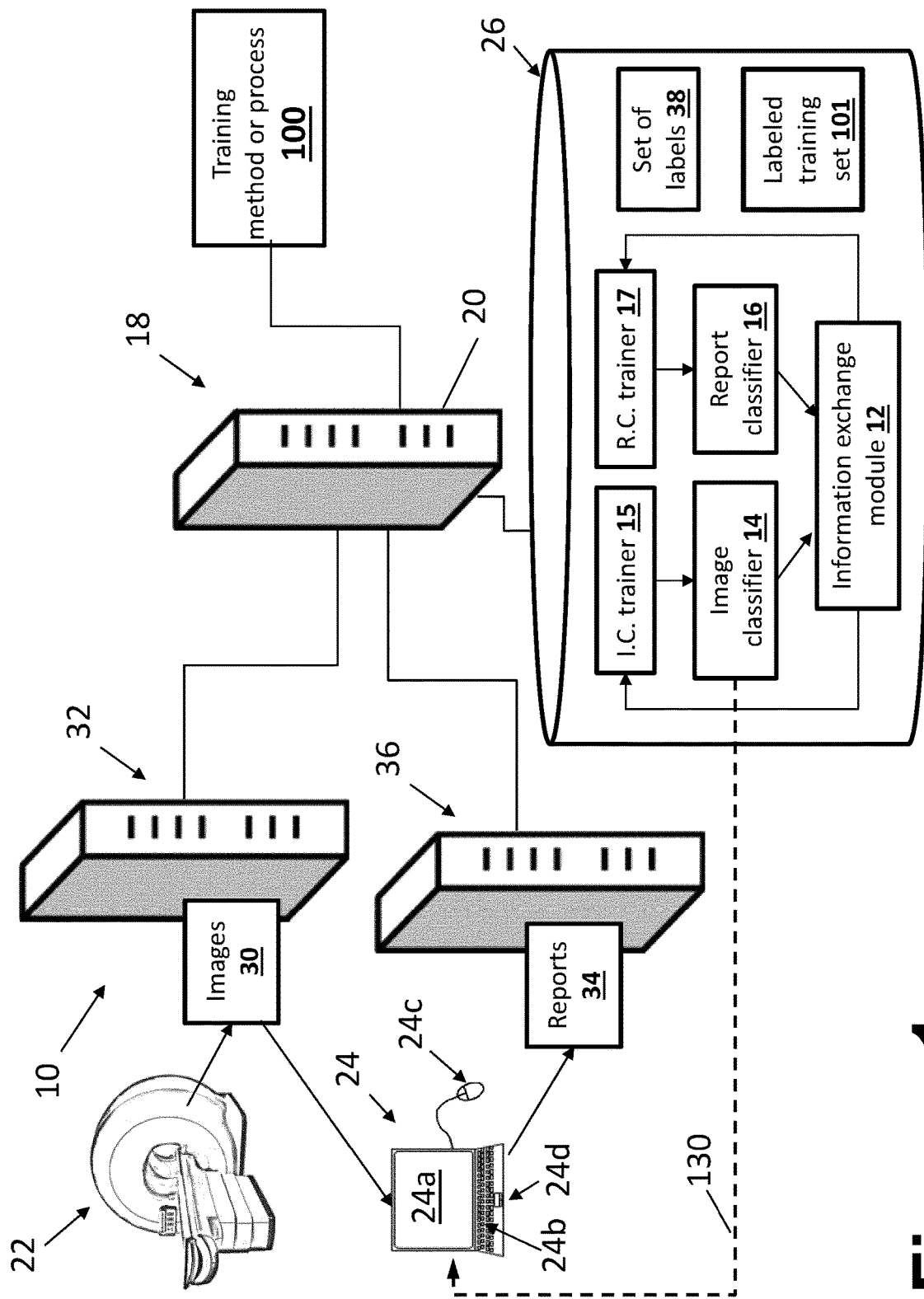
FIG. 1 diagrammatically illustrates an illustrative system for training an image classifier in accordance with the present disclosure.

The following relates to improved ML image classifiers in situations in which there is a limited number of labeled images for use in the training. In these cases, a known approach is to employ self-training. By this approach, the initial (small) set of training images are used to initially train the image classifier. Then, the initially trained image classifier is used to classify some unlabeled images, thus producing "pseudo-labels" for those images. The pseudo-labels are treated as actual labeled and fed back to further train the image classifier. A potential problem with this approach is that if the pseudo-label is incorrect, then feeding it back for use in further training merely reinforces the mislabeling performed by the image classifier.

Improved embodiments disclosed herein leverage the corresponding radiology reports in a co training paradigm. In this approach, an initial image classifier is trained on the labeled training images, and an initial report classifier is trained on the labeled radiology reports. These are used to generate pseudo-labeled images and pseudo-labeled reports, respectively. However, in this co-training paradigm, the feedback for further training of the image classifier relies (at least in part) on the pseudo-labels generated by the report classifier; and vice versa.

This approach leverages the recognition made herein that, for a given set of labels to be used in labeling medical images, the radiology reports provide a strongly differentiated second view of the information which can be leveraged in training the image classifier. The radiology reports are generated by skilled radiologists who review the images and create the radiology reports. The set of labels typically include clinical finding labels, image artifact labels, and/or so forth. The information represented by these labels is also likely to be included in the corresponding radiology report, as the radiology report usually contains the clinical findings of the radiologist, and may also contain mentions of observed image artifacts, especially if they impact determination of the clinical findings. Furthermore, the nature of the information relied upon by the ML image classifier is different in kind from the information relied upon by a ML radiology report classifier. The ML image classifier is often a convolutional neural network (CNN) or other ML component that receives and operates on the image directly, and/or on image features automatically extracted from the image such as features of image patches. By contrast, the ML radiology report classifier often operates on textual content of the radiology report. For example, the ML radiology report classifier may take as input a "bag-of-words" representation of the radiology report, and/or may perform automated natural language processing (NLP) such as grammatical parsing to label words, phrases, or other text with parts of speech (e.g., nouns, verbs, noun phrases, verb phrases, adjectives, and so forth). Due to such fundamental differences in the kind of information content being processed by the image classifier and the radiology report classifier, respectively, images that are classified with low confidence by the image classifier may have their corresponding radiology reports classified with high confidence by the radiology report classifier; and vice versa. The high confidence report classification (pseudo-)label can thus be assigned to the corresponding image to provide further training data (and vice versa where the image classification is of higher confidence).

A further advantage of the disclosed approaches is that many hospitals and other medical institutions already have a large database of images with corresponding radiology reports. In typical medical practice, every imaging examination is "read" by a radiologist who reviews the images and prepares the corresponding radiology report. Radiologists are medical professionals (e.g., medical doctors) with specialized training in interpreting radiology images. Hence, the content of the radiology reports is generally considered to be highly reliable. The radiology report classifier also can often assign labels with high confidence. For example, if the set of labels includes clinical finding labels, radiology reports often use standardized language in reporting clinical findings, making automated detection of clinical findings in the radiology report relatively straightforward and accurate.

Nonetheless, there may be situations in which the assignment of a clinical finding label to an image by an image classifier may be more reliable than the assignment of the clinical finding label to the corresponding radiology report. For example, this could arise if the radiologist who prepared the report used non-standard terminology or phrasing in describing the clinical finding. In this case, the clinical finding label assigned by the image classifier can be leveraged to improve training of the radiology report classifier.

In some embodiments disclosed herein, the selection of pseudo-labeled images for use in further training of the image model are selected as follows: images whose pseudo-label has a low confidence but whose corresponding report has the same pseudo-label with a high confidence are fed back to the further training of the image classifier. This leverages the high confidence of the report pseudo-label which reinforces the reliability of the low-confidence image pseudo-label. In similar fashion, reports whose pseudo-label has low confidence but whose corresponding image pseudo-label has high confidence are fed back, again leveraging the high confidence of the image pseudo-label which reinforces the reliability of the low-confidence report pseudo label.

In other embodiments disclosed herein, if the image label and corresponding report label are contradictory (i.e. different), then the feedback can again be done using the same confidence-based selection criterion. However, in this case the low-confidence image label may be replaced by the high confidence different report label (or vice versa).

In some embodiments disclosed herein, the report model may be fixed, and used to provide reinforcement in feeding back pseudo-labeled images in training the image classifier. Conversely, the image model may be fixed, and used to provide reinforcement in feeding back pseudo-labeled reports in training the report classifier.

In other embodiments disclosed herein, if there are multiple views for which image classifiers are to be trained (e.g., a lateral view and a frontal view, such as an anteroposterior (AP) view, a posteroanterior (PA) view, and so forth), then there can be three co-training models: one for the lateral view images; one for the frontal view images; and one for the reports. The feedback can again be done based on high versus low confidences in the pseudo-labels generated by the three models. Other selection criteria which is not confidence-based can also be employed. For example, images whose lateral view model and report model have the same pseudo-label are fed back to the further training of a frontal view image classifier. This leverages the agreement between the lateral image view model and the report model. In a similar fashion, images with a frontal view image model and a report model having the same pseudo-label are fed back to the further training of the lateral view image classifier, and images whose frontal view image model and lateral view model has the same pseudo-label are fed back for further training of the report classifier. In other embodiments, the contradictory findings between one model and the other two models can be leveraged. For example, if the lateral view label and corresponding report label are same, they are fed back for further training of the frontal view image classifier only if that are contradictory to the frontal view label.

In further embodiments disclosed herein, for images with multiple views, the report model can be omitted. In these embodiments, the selection criteria can be used to train the multiple view image models. To do so, a method is disclosed of training a first-view ML image classifier to classify images of a first view respective to a set of labels using a set of first-view images which are not labeled respective to the set of labels and training a second-view ML image classifier to classify images of a second view respective to the set of labels using a set of second-view images corresponding that are not labeled respective to the set of labels and that correspond to the images of the first view. The method includes: (i) for the first-view images, generating first-view image-based labels for the images from the set of labels and first-view image-based label confidence values for the image-based labels by applying the first-view ML image classifier to the first-view images; (ii) for the second-view images, generating second-view image-based labels for the images from the set of labels and second-view image-based label confidence values for the image-based labels by applying the second-view ML image classifier to the second-view images; (iii) selecting a first-view training subset of the set of first-view images based on the first-view image-based labels, the second-view image-based labels, the first-view image-based label confidence values, and the second-view image-based label confidence values; (iv) selecting a second-view training subset of the set of second-view images based on the first-view image-based labels, the second-view image-based labels, the first-view image-based label confidence values, and the second-view image-based label confidence values; (v) assigning a pseudo-label for each first-view image of the first-view training subset which is one of the first-view image-based label or the corresponding second-view image-based label; (vi) assigning a pseudo-label for each second-view image of the second-view training subset which is one of the second-view image-based label or the corresponding first-view image-based label; and repeating the steps (i), (ii), (iii), (iv), (v), and (vi) for at least one iteration.

In some embodiments disclosed herein, the selection criteria can employ additional factors besides the confidence levels. For example, if the original labeled training data has few examples of a particular class, then the feedback can preferentially feedback images (or reports) that are pseudo-labeled with that scarce class.

With reference to FIG. 1, an illustrative apparatus 10 for training a machine-learned (ML) image classifier 14 is shown. The ML image classifier 14 can comprise an artificial neural network (ANN), for example a convolutional neural network (CNN). The ML image classifier 14 is also sometimes referred to herein as an image model. The image classifier 14 is trained by an image classifier trainer 15 to process an image and output a label (or, in a multi-class classifier, multiple labels of different classes) for the image. The label that is output is one of a set of labels 38. Additionally, there is provided a ML radiology report model or classifier 16, which may be trained by a corresponding radiology report classifier trainer 17. Alternatively, if the radiology report classifier 16 is provided pre-trained, then the radiology report classifier trainer 17 may be omitted.

Additionally, an information exchange module 12 operates to select pseudo-labels generated by the ML radiology report model or classifier 16 and assign them to corresponding images to create additional labeled (or, here, pseudo-labeled) image training data for use by the image classifier trainer 15. Optionally, the information exchange module 12 may also operate to select pseudo-labels generated by the ML image model or classifier 14 and assign them to corresponding radiology reports to create additional labeled (or, here, pseudo-labeled) radiology report training data for use by the radiology report classifier trainer 17.

FIG. 1 also shows an ML electronic processing device 18, such as a server computer, or more generally a computer (but may also be any other suitable electronic processing device, such as a workstation computer, tablet computer, cellular telephone ("cellphone"), and so forth). A disclosed image classifier generating process 100 implemented by the components 12, 14, 15, 16, 17 may be performed entirely by a local electronic processor, or a portion of the image classifier generating process may be performed by a remote electronic processor. In the latter case, the electronic processing device 18 may be at least partially embodied as a plurality of server computers, e.g. interconnected to form a server cluster, cloud computing resource, or so forth.

The server computer 18 can include typical components, such as an electronic processor 20 (e.g., a microprocessor; again, in some embodiments part of the image classifier generating process may be performed by the microprocessor of a remote server or cloud computing resource). The electronic processor 20 is operatively connected with one or more non-transitory storage media 26 which stores instructions readable and executable by the at least one electronic processor 20 to implement the components 12, 14, 15, 16, 17 and the method or process 100. The non-transitory storage media 26 may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the server computer 18, various combinations thereof, or so forth. It is to be understood that any reference to a non-transitory medium or media 26 herein is to be broadly construed as encompassing a single medium or multiple media of the same or different types. Likewise, the electronic processor 20 may be embodied as a single electronic processor or as two or more electronic processors. The non-transitory storage media 26 stores instructions executable by the at least one electronic processor 20. The instructions can include instructions related to the generation of the image classifier 12.

The apparatus 10 for co-training a machine-learned (ML) image classifier 14 and the radiology report classifier 16 further includes, or operates in conjunction with, a radiology laboratory environment. This environment includes one or more imaging devices, diagrammatically represented in FIG. 1 by a single illustrative imaging device 22. By way of non-limiting illustration, the imaging device 22 may be a magnetic resonance imaging (MRI) scanner, a transmission computed tomography (CT) scanner, a positron emission tomography (PET) scanner, an ultrasound imaging device, a fluoroscopy imaging device, or so forth. In normal operation, a hospital patient, medical outpatient, or other imaging subject is loaded into an examination region of the imaging device 22, and images 30 are acquired in accordance with an examination order issued by a medical doctor treating the patient, or in accordance with a standard screening examination workflow, or so forth. Typically, an imaging technician operates the imaging device 22. The images 30 generated from the imaging session are stored in a database 32, such as a Picture Archiving and Communication System (PACS) database.

At some subsequent time, a radiologist operates a radiology workstation 24 to retrieve the images 30 from the PACS 32 and perform the radiology reading. The reading process includes displaying images on a display 24a of the radiology workstation 24, and textually describing the radiologist's clinical findings or other observations (e.g., noted image artifacts) in a radiology report entered by the radiologist using a keyboard 24b, mouse 24c, trackpad 24c, and/or other user input device(s) of the radiology workstation 24. Although not shown, it is common for the radiology workstation to include multiple displays, e.g. one for presenting the images 30 and the other providing a graphical user interface (GUI) via which the radiology report is entered. Additionally, some radiology workstations include a microphone (not shown) to enable verbal dictation of the radiology report (in conjunction with suitable voice-to-text software running on the workstation 24). While the radiology report is typically mostly text (including numbers), the radiology report may optionally include content of other types, e.g. embedded thumbnail images, diagrams, or so forth. The resulting radiology reports 34 generated by radiologists reading imaging examinations are stored in a database 36, such as a Radiology Information System (RIS) database. In some radiology laboratory environments, the image and reporting databases 32, 36 are integrated, e.g. as an integrated RIS/PACS database.

It will be noted that this workflow in which imaging technicians operate imaging devices 22 to acquire medical images that are subsequently read by radiologists, who then generate corresponding radiology reports means that most or all images will have a corresponding radiology report, and likewise each radiology report will have one or more corresponding images. There may, and often is, be more than one image acquired during an imaging examination. In such a case, one image may be designated by the radiologist as the reference image during the reading, or multiple images may be so designated. (As an example of the latter, there may be a reference lateral view image and a reference anterior-posterior view image). Hence, the usual workflow of the radiology laboratory environment naturally creates a database of images and corresponding radiology reports.

Figure 2:
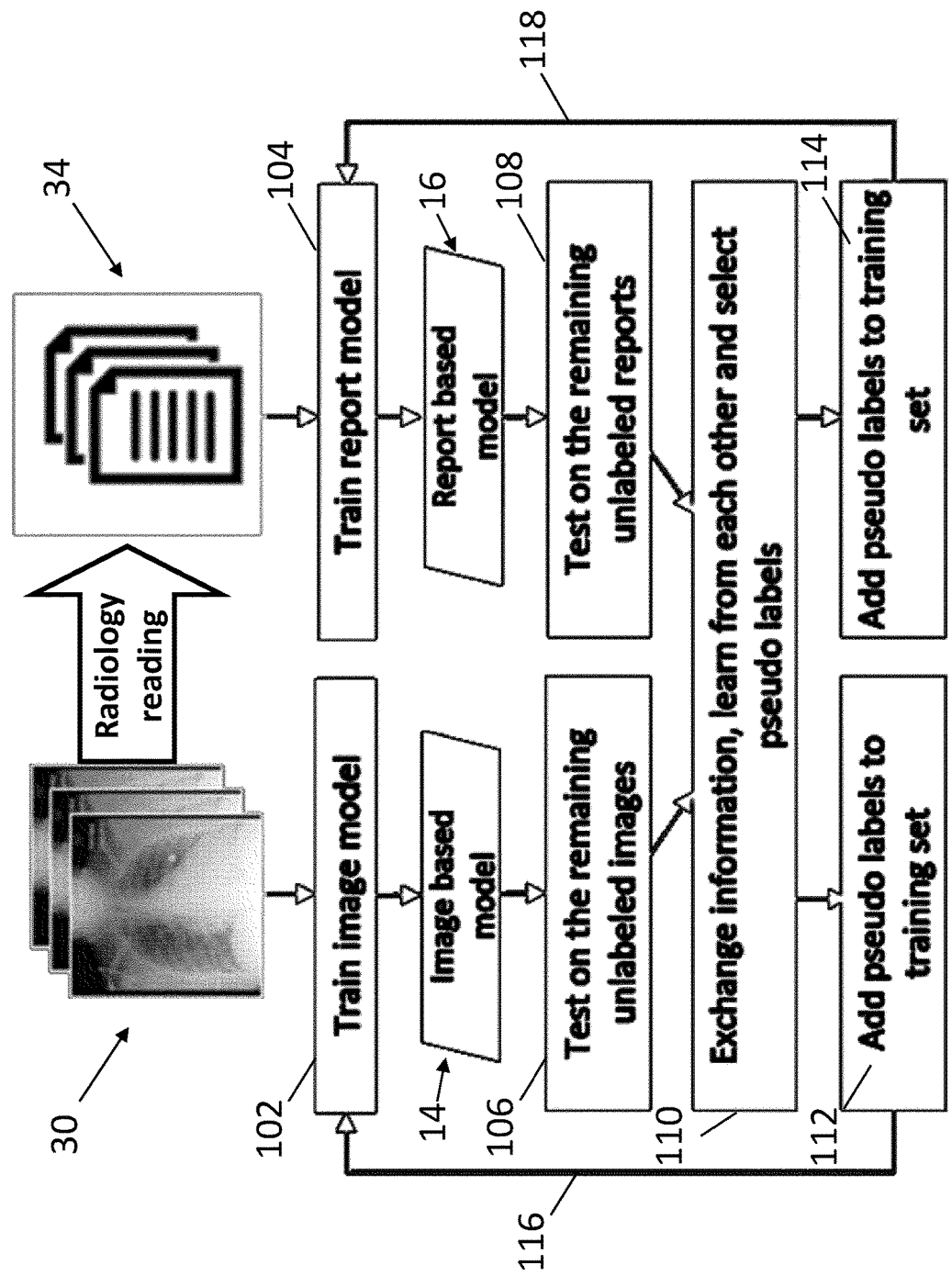
FIG. 2 shows exemplary flow chart operations of the system of FIG. 1.

With reference to FIG. 2, and with continuing reference to FIG. 1, the at least one electronic processor 20 is configured as described above to perform the method or process 100 for co-training the image classifier 14 and the radiology report classifier 16. The non-transitory storage medium 26 stores instructions which are readable and executable by the at least one electronic processor 20 to perform disclosed operations including performing the method or process 100. In some examples, the method 100 may be performed at least in part by cloud processing.

To begin the method 100, one or more imaging sessions are performed in which a patient is imaged by an image acquisition device, such as the imaging device 22. Images 30 generated from the imaging sessions are stored in the PACS database 32. In addition, associated radiology reports 34 generated by radiologists after the imaging sessions are stored in the RIS database 36. A set of labels 38 are stored in the non-transitory computer readable medium 26 of the server computer 18, and can be assigned to either images 30 or reports 34 to generate labeled training data to train the image classifier 12. One example of a label in the set of labels 38 can include {lung tumor present, no lung tumor present}. Labeling images or reports can be done manually—however, this is a tedious process which can only be done by a suitable domain expert, such as a trained radiologist.

Initially, therefore, usually only a small portion of the images 30 and the reports 34 are manually labeled in order to create a labeled training set 101 that is used start the classifier co-training process. The labeled training set 101 (which can be stored in the non-transitory computer readable medium 26) comprising labeled images that are labeled respective to the set of labels 38 are used to train the image model 14. This is diagrammatically shown in FIG. 2 as a first-pass-through image model training operation 102 suitably performed by the image classifier trainer 15 of FIG. 1. Likewise, the labeled training set 101 comprising labeled radiology reports that are labeled respective to the set of labels 38 are used to train the radiology report model 16. This is diagrammatically shown in FIG. 2 as a first-pass-through report model training operation 104 suitably performed by the radiology report classifier trainer 17 of FIG. 1.

By way of non-limiting illustration, the training operation 102 of the image classifier 14 may be done as follows. The image model 14 may output a probability value in the range of [0,1] that the image 30 depicts a feature designated by a certain label (e.g., if the label is a clinical finding then this probability value is the probability that the image depicts features characteristic of that clinical finding). If the probability is above a threshold T, which is typically a parameter that is optimized by the training, then that label is assigned to the image 30. Conversely, if the probability is below threshold T then that label is not assigned to the image. The training is performed on the labeled training set 101, so the "ground truth" label is known, as it was assigned by a human radiologist (in the first pass). Hence, the training adjusts the parameter T and other parameters of the model, such as activation parameters and weights of a neural network in the case of an artificial neural network (ANN)-based image classifier, to maximize agreement of the outputs of the image classifier 14 with the ground truth labels of the labeled training set 101.

The training operation 104 of the report model 16 operates similarly, but here relying on the human radiologist-assigned labels for the radiology reports 34 as the ground truth. Parameters may include the threshold T as in the image classifier, as well as text-based model parameters such as word or phrase weights (which may be dependent on part-of-speech of the word if a NLP parser is employed) or so forth.

The classification produced by the first pass through the training operations 102, 104 are of limited accuracy due to the typically small size of the manually labeled training set 101. There may be few, or even no, examples of certain labels in the images and/or reports of the manually labeled training set 101. Co-training is thus employed in an iterative fashion to build up additional examples from the images 30 and radiology reports 34. To this end, in an operation 106, the initially trained image classifier 14 is applied to the unlabeled images of the set of images 30; and likewise in an operation 108, the initially trained radiology report classifier 16 is applied to the unlabeled radiology reports of the set of radiology reports 34. As these labels are not manually assigned but rather are assigned by the classifiers 14, 16 which are "in training", the labels produced in the operations 106, 108 are referred to herein as pseudo-labels.

Since the manually labeled training set 101 usually includes only a small fraction of the images 30 and reports 34, it follows that the applying operations 106, 108 are performed on the majority of the images and reports which are not manually labeled. The applying operation 106, in addition to assigning pseudo-labels to the unlabeled images, also assigns image-based label confidence values for the pseudo-labels. If the image classifier 14 employs a model that outputs a label probability, then the confidence is suitably computed based on how close this probability is to the threshold—a probability close to the threshold will be of low confidence, whereas a probability that is far above the threshold (or far below the threshold) will be of high confidence. This is merely an example, and other approaches can be used. For example, confidence of a pseudo-label generated by an image classifier that identifies a tumor clinical finding may depend on the size of the image feature that the image classifier 14 identifies as a tumor, e.g. with smaller tumors being of lower confidence.

In similar fashion, the applying operation 108, in addition to assigning pseudo-labels to the unlabeled radiology reports 34, also assigns report-based label confidence values for the pseudo-labels. If the report classifier 16 employs a model that outputs a label probability, then again the confidence is suitably computed based on how close this probability is to the threshold. This is again merely an example, and other approaches can be used. For example, if the report classifier 16 is based on identification of keywords in the radiology report, then "strong" keywords may be associated to high confidence while "weak" keywords may be associated to low confidence. Here a "strong" keyword might, for example, be a verbatim statement of the finding, e.g. "tumor", while a "weak" keyword might, for example, be "anomalous feature". Where NLP parsing is employed, associated adjectives or the like may also be used in defining the confidence, e.g. "tumor observed" may associate to high confidence whereas "possible tumor" may associate to lower confidence.

In an operation 110 suitably performed by the information exchange module 12 of FIG. 1, the pseudo-labels generated in operations 106, 108 are processed in order to add pseudo-labels 112 to unlabeled images of the set of images 30 and to add pseudo-labels 114 to unlabeled reports of the set of reports 34. The additional pseudo-labeled images are treated as actual labeled images and are fed back to the operation 102 to further train the image classifier 14, as indicated by process flowback arrow 116. Likewise, the additional pseudo-labeled radiology reports are treated as actual labeled reports and are fed back to the operation 104 to further train the report classifier 16, as indicated by process flowback arrow 118. The described process may be iterated once, or multiple times, with each additional iteration adding more pseudo-labeled data to the respective (now partially pseudo-) labeled image and report training datasets.

In one approach, images 30 whose pseudo-label has a low confidence but whose corresponding report has the same pseudo-label with a high confidence are added to the images 30 with pseudo-labels 112 that are fed back to the further training of the image classifier 14. Likewise, reports 34 whose pseudo-label has a low confidence but whose corresponding image 30 has the same pseudo-label with a high confidence are added to the reports 34 with pseudo-labels 114 that are fed back to the further training of the report classifier 16. This approach leverages high confidence pseudo-labels of one type (i.e., report or image) to reinforce the reliability of the low-confidence labels of the other type (i.e., image or report).

Additionally, if the image label and corresponding report label are contradictory (i.e. different), then the feedback can again be done using the same confidence-based selection criterion. However, in this case the low-confidence image label may be replaced by the high confidence different report label (or vice versa).

In a variant embodiment, the report model 16 may be fixed such that the training operation 104 and generation of the pseudo-labeled reports 114 is omitted. In this case, only the image classifier 14 is trained, but still leveraging pseudo-labels produced by the (here fixed) report model 16. Conversely, the image model 14 may be fixed, and used to provide reinforcement in feeding back pseudo-labeled reports in training the report classifier 16.

In the embodiment of FIG. 2, there is a single image classifier 14 being trained. In a variant embodiment, two (or more) different image classifiers may be trained (e.g., a lateral view image classifier and frontal view image classifier). In this case there are three (or more) co-training models: one for the lateral view images; one for the frontal images; and one for the reports. The feedback can again be done based on high versus low confidences in the pseudo-labels generated by the three models. Other selection criteria which is not confidence-based can also be employed. For example, images whose lateral view model and report model have the same pseudo-label are fed back to the further training of a frontal view image classifier. This leverages the agreement between the lateral image view model and the report model. In a similar fashion, images with a frontal view image model and a report model having the same pseudo-label are fed back to the further training of the lateral view image classifier, and images whose frontal view image model and lateral view model has the same pseudo-label are fed back for further training of the report classifier. In other embodiments, the contradictory findings between one model and the other two models can be leveraged. For example, if the lateral view label and corresponding report label are same, they are fed back for further training of the frontal view image classifier only if that are contradictory to the frontal view label.

In further embodiments disclosed herein, for images with multiple views, the report model can be omitted. In these embodiments, the selection criteria can be used to train the multiple view image models. In these embodiments, the method 100 includes training a first-view ML image classifier 14 to classify images 30 of a first view (e.g., lateral views) respective to a set of labels using a set of first-view images which are not labeled respective to the set of labels and training a second-view ML image classifier 14 to classify images of a second view (e.g., frontal views) respective to the set of labels using a set of second-view images corresponding that are not labeled respective to the set of labels and that correspond to the images of the first view. The method 100 includes: (i) for the first-view images 30, generating first-view image-based labels for the images from the set of labels and first-view image-based label confidence values for the image-based labels by applying the first-view ML image classifier to the first-view images; (ii) for the second-view images, generating second-view image-based labels for the images from the set of labels and second-view image-based label confidence values for the image-based labels by applying the second-view ML image classifier to the second-view images; (iii) selecting a first-view training subset of the set of first-view images based on the first-view image-based labels, the second-view image-based labels, the first-view image-based label confidence values, and the second-view image-based label confidence values; (iv) selecting a second-view training subset of the set of second-view images based on the first-view image-based labels, the second-view image-based labels, the first-view image-based label confidence values, and the second-view image-based label confidence values; (v) assigning a pseudo-label for each first-view image of the first-view training subset which is one of the first-view image-based label or the corresponding second-view image-based label; and (vi) assigning a pseudo-label for each second-view image of the second-view training subset which is one of the second-view image-based label or the corresponding first-view image-based label; and repeating the steps (i), (ii), (iii), (iv), (v), and (vi) for at least one iteration.

Optionally, the selection criteria employed by the operation 110 can employ additional factors besides the confidence levels in selecting the additional images and reports with pseudo-labels to be fed back for use in the next iteration of the classifier training. For example, if the original labeled training data has few examples of a particular class, then the feedback can preferentially feedback images (or reports) that are pseudo-labeled with that scarce class.

With returning reference to FIG. 1, upon completion of the co-training described with reference to FIG. 2, the image classifier 14 is now trained for use in clinical tasks. For example, as diagrammatically indicated by dashed arrow 130, a radiologist performing a reading at the radiology workstation 24 might choose to apply the image classifier 14 to an image 30 being read. As a more specific example, the radiologist might apply the image classifier 14 trained to detect a prostate tumor in a prostate MRI image to an MRI image of an MRI imaging examination being read. The trained image classifier 14 then produces treatment data, in this case comprising identification of a prostate tumor, that may then be subject of a biopsy procedure, radiation therapy, or other treatment of the patient.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A non-transitory computer readable medium storing instructions executable by at least one electronic processor to perform a method of training a machine-learned (ML) image classifier to classify images respective to a set of labels using a set of images which are not labeled respective to the set of labels and corresponding radiology reports that are not labeled respective to the set of labels, the method comprising:

performing an initial training of the ML image classifier using a labeled training set comprising labeled images, wherein the labeled images are labeled respective to the set of labels:

generating image-based labels for the images from the set of labels and image-based label confidence values for the image-based labels by applying the initially-trained ML image classifier to the images;

generating report-based labels for the images from the set of labels and report-based label confidence values for the report-based labels by applying a report classifier to the corresponding radiology reports;

selecting a training subset of the set of images based on the image-based labels, the report-based labels, the image-based label confidence values, and the report-based label confidence values of the corresponding image, and wherein selecting an image for inclusion in the training subset is based at least in part on the image-based label confidence value of the image being lower than the report-based label confidence value of the image;

assigning a pseudo-label for each image of the training subset, wherein the pseudo-label is one of the generated image-based label for the image or the generated report-based label for the image; and training the ML image classifier using at least the selected training subset, the assigned pseudo-labels, and the labeled training set.

2. The non-transitory computer readable medium of claim 1, wherein the selecting of the image for inclusion in the training subset is further based on the image-based label for the image and the report-based label for the image being the same.

3. The non-transitory computer readable medium of claim 1, wherein the selecting of the image for inclusion in the training subset is further based on the image-based label for the image and the report-based label for the image being the different, and the assigning assigns the report-based label as the pseudo-label for the image.

4. The non-transitory computer readable medium of claim 1, wherein the method further comprises:

selecting a report training subset of the set of radiology reports based on the image-based labels, the report-based labels, the image-based label confidence values, and the report-based label confidence values of the corresponding image, and assigning a report pseudo-label for each radiology report of the report training subset which is one of the image-based label or the report-based label for the corresponding image; and training the report classifier using at least the selected report training subset and the assigned report pseudo-labels.

5. The non-transitory computer readable medium of claim 4, wherein the selecting of a radiology report for inclusion in the report training subset is based at least in part on the image-based label confidence value of the corresponding image being higher than the report-based label confidence value of the corresponding image.

6. The non-transitory computer readable medium of claim 1, wherein the set of images includes corresponding images of two different views, the ML image classifier includes a first ML image classifier for the first view and a second ML image classifier for the second view, and wherein:

the generating of the image-based labels includes:
generating first view image-based labels for the images from the set of labels and first view image-based label confidence values for the first view image-based labels by applying the first ML image classifier to the images of the first view, and generating second view image-based labels for the images from the set of labels and second view image-based label confidence values for the second view image-based labels by applying the second ML image classifier to the images of the second view; and the selecting of the training subset is based on the first view image-based labels, the second view image-based labels, the report-based labels, the first view image-based label confidence values, the second view image-based label confidence values, and the report-based label confidence values, and the assigning includes assigning a pseudo-label for each image of the training subset which is one of the first view image-based label, the second view image-based label, or the report-based label for the image.

7. The non-transitory computer readable medium of claim 1, wherein the ML image classifier comprises an artificial neural network (ANN).

8. A non-transitory computer readable medium storing instructions executable by at least one electronic processor to perform a method of training a machine-learned (ML) report classifier to classify images respective to a set of labels using a set of images which are not labeled respective to the set of labels and corresponding radiology reports that are not labeled respective to the set of labels, the method comprising:

performing an initial training of the ML image classifier using a labeled training set comprising labeled images, wherein the labeled images are labeled respective to the set of labels:

generating image-based labels for the images from the set of labels and image-based label confidence values for the image-based labels by applying a ML image classifier to the images;

generating report-based labels for the images from the set of labels and report-based label confidence values for the report-based labels by applying the report classifier to the corresponding radiology reports;

selecting a report training subset of the set of radiology reports based on the image-based labels, the report-based labels, the image-based label confidence values, and the report-based label confidence values of the corresponding image, and wherein selecting a report for inclusion in the training subset is based at least in part on the image-based label confidence value of the report being lower than the report-based label confidence value of the image;

assigning a report pseudo-label for each radiology report of the report training subset, wherein the report pseudo-label is one of the generated image-based label for the corresponding image or the report-based label for the corresponding image; and training the report classifier using at least the selected report training subset, the assigned report pseudo-labels, and the labeled training set.

9. The non-transitory computer readable medium of claim 8, wherein the selecting of the report for inclusion in the training subset is further based on the image-based label for the report and the report-based label for the report being the same.

10. The non-transitory computer readable medium of claim 8, wherein the selecting of the report for inclusion in the training subset is further based on the image-based label for the report and the report-based label for the report being the different, and the assigning assigns the report-based label as the pseudo-label for the report.

11. The non-transitory computer readable medium of claim 8, wherein the method further comprises:
   selecting a training subset of the set of images based on the image-based labels, the report-based labels, the image-based label confidence values, and the report-based label confidence values;
   assigning a pseudo-label for each image of the training subset which is one of the image-based label or the report-based label for the image; and
   training the ML image classifier using at least the selected training subset and the assigned pseudo-labels.

12. The non-transitory computer readable medium of claim 11, wherein the selecting of an image for inclusion in the image training subset is based at least in part on the image-based label confidence value of the corresponding report being higher than the report-based label confidence value of the corresponding image.

13. The non-transitory computer readable medium of claim 8, wherein the ML report classifier comprises an artificial neural network (ANN).

14. A method of training a machine-learned (ML) image classifier and a trained ML report classifier to classify images respective to a set of labels using a set of images which are not labeled respective to the set of labels and corresponding radiology reports that are not labeled respective to the set of labels and training, the method comprising:
   generating image-based labels for the images from the set of labels and image-based label confidence values for the image-based labels by applying the ML image classifier to the images;
   generating report-based labels for the images from the set of labels and report-based label confidence values for the report-based labels by applying the ML report classifier to the corresponding radiology reports;
   selecting a training subset of the set of images based on the image-based labels, the report-based labels, the image-based label confidence values, and the report-based label confidence values of the corresponding image, and wherein selecting an image for inclusion in the training subset is based at least in part on the image-based label confidence value of the image being lower than the report-based label confidence value of the image;
   selecting a report training subset of the set of radiology reports based on the image-based labels, the report-based labels, the image-based label confidence values, and the report-based label confidence values of the corresponding image, wherein selecting a report for inclusion in the training subset is based at least in part on the image-based confidence value of the report being lower than the report-based label confidence value of the image;
   assigning an image pseudo-label for each image of the training subset, wherein the image pseudo-label is one of the generated image-based label for the image or the generated report-based label for the image;
   assigning a report pseudo-label for each radiology report of the report training subset, wherein the report pseudo-label is one of the generated image-based label for the corresponding image or the generated report-based label for the corresponding image;
   training the ML image classifier using at least the selected training subset, the assigned pseudo-labels, and the labeled training set; and
   training the report classifier using at least the selected report training subset, the assigned report pseudo-labels, and the labeled training set.

* * * * *